// United States Patent [15] 3,699,263
Neumeier et al. [45] Oct. 17, 1972

[54] LINE SCANNER AND MARKER ARRANGEMENT USING GROUP SCANNING

[72] Inventors: Gunter F. Neumeier; Otto Altenburger, both of Rochester, N.Y.

[73] Assignee: Stromberg-Carlson Corporation, Rochester, N.Y.

[22] Filed: Dec. 23, 1970

[21] Appl. No.: 101,091

[52] U.S. Cl. ....179/18 FF
[51] Int. Cl. ....H04q 3/495
[58] Field of Search....179/18 F, 18 FF, 18 FG, 18 E, 179/18 AB, 18 FA, 22

[56] References Cited

UNITED STATES PATENTS 3,349,188 10/1967 Stirling et al. ....179/18 FF
3,406,258 10/1968 Peeters et al. ....179/18 AB
3,202,767 8/1965 Warman ....179/18 FG

*Primary Examiner*—Thomas W. Brown
*Attorney*—Craig, Antonelli, Stewart & Hill

[57] ABSTRACT

A line scanner and marker arrangement for a common control telephone system in which the line circuits are scanned in groups rather than on an individual line-by-line basis. A request for service detected from one or more lines in a group being scanned stops the scanning on that group and initiates the scanning of the individual lines of the group. The system may be expanded in size without changing the scanning time by scanning more than one group of lines at a time and then scanning the individual lines of the combination of groups when a request for service is detected from one or more lines.

26 Claims, 16 Drawing Figures

LINE SCANNER AND MARKER ARRANGEMENT USING GROUP SCANNING

The present invention relates in general to automatic telephone systems, and more particularly to a line scanner and marker for an electronic telephone system.

In common control telephone systems, a line scanner is normally provided for detecting request for service from the plurality of line circuits serviced by the exchange equipment. In the conventional scanning operation, the line scanner continuously scans the line circuits on a line-y-line basis until an off-hook condition is detected, at which time the scanner is stopped and a line marker is seized to mark the particular line circuit designated by the line scanner and initiate the procedure for connecting a register to the line circuit so that dial tone may be provided and dialed digits may be received to determine the destination of the call.

The line scanner is also utilized for terminating functions within the system in connection with the line marker. Thus, once the common control equipment determines the line circuit within the exchange which represents the destination of a call, the line scanner is called upon to seek out the desired line circuit and thereby aid the line marker in marking this line circuit so that a communication connection either from a local calling line circuit or incoming trunk circuit to this line circuit can be effected.

With the advent of electronic telephone systems, the possibility of materially reducing the time required to perform the operations necessary to establish a communication connection between parties has been greatly reduced because of the nature of the equipment which makes up the system. However, there is a practical limit to the speed at which various functions can be performed without sacrificing reliability, these limits very often being imposed by various individual elements which make up component parts of the system. One of the areas where increased speed of operation is most desirable is in the line scanning and marking operation. The objective, of course, in improving such operation is to reduce the time required during even heavy traffic conditions for detecting a subscriber request for service and applying dial tone to the line circuit to enable the subscriber to begin the dialing operation. In conventional systems providing scanners which operate on a line-by-line basis, the amount to which such time of response can be reduced is limited by available scanning equipment and the number of lines serviced by the scanning equipment.

It is an object of the present invention to provide a line scanner and marker arrangement for electronic telephone systems which even further reduces the response time of the scanning and marking operation without sacrificing reliability and accuracy in the operation performed by this equipment.

It is a further object of the present invention to provide a line-scanning and marking operation for an electronic telephone system which is capable of providing a desirable response time in the scanning and marking operation without requiring the use of more expensive, high speed circuit elements.

The line scanner and marker arrangement in accordance with the present invention is characterized by the fact that the line circuits are scanned continuously in groups rather than on a line-by-line basis. For example, the lines may be scanned in groups of ten at a time to detect originating request in a system servicing 1,000 lines. With such an arrangement, the number of lines in the system can be increased, for example, to 2,000 lines and the cycle time of the scanning operation can be maintained the same as for the thousand line system by increasing the number of lines simultaneously scanned in each group to 20. In this way, the scanning cycle time can be actually reduced as compared to the conventional line-by-line scanning system while still servicing lines on as rapid or more rapid a basis than the conventional systems.

By reducing the individual line rate of scan by scanning the line circuits in groups, scanning equipment which is less critical and therefore less expensive can be used without sacrificing reliability or reducing the cycle time of the scanning operation. The scanning of an increased number of lines in the same cycle time is also made possible, thereby increasing the efficiency of the system.

These and other objects, features and advantages of the present invention will become more apparent from the following detailed description thereof when taken in conjunction with the accompanying drawings, which illustrate one specific embodiment of the present invention, and wherein.

GENERAL SYSTEM DESCRIPTION

Figure 1:
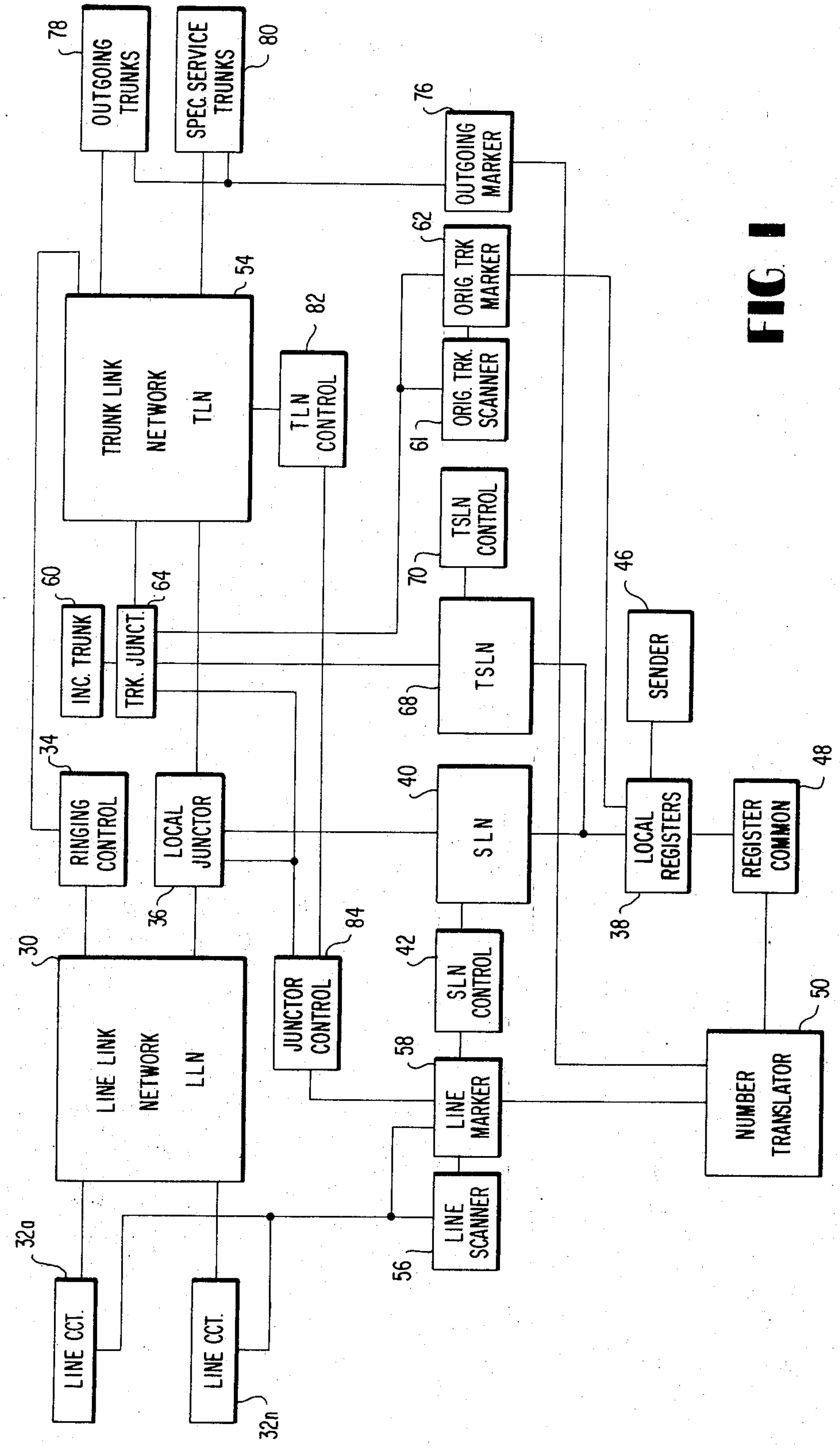
FIG. 1 is a basic block diagram of a telephone system including the present invention.

FIG. 1 of the drawing illustrates a basic block diagram of a telephone system including a plurality of line circuits 32*a* through 32*n* connected to a line link network (LLN) 30, which functions as a concentrator for originating line calls and a fan-out for terminating calls. The line link network 30 may consist, for example, of three stages of matrices which are used for both originating and terminating types of traffic.

The final stage of the line link network 30 provides termination for both originating traffic from the line circuits and incoming traffic to the line circuits. These terminations are connected to the local junctors 36 in the case of originating traffic and to the ringing controls 34 for terminating traffic. The number of local junctors and ringing controls provided depends upon the traffic requirements for the system.

The local junctors 36 include provisions for connecting the line circuits to the local registers 38 through a service link network 40 under control of a service link network control 42. The local junctors 36 also provide transmission battery for both the calling and called parties on intra-office calls, but are under the control of the calling party.

The local registers detect rotary dial pulses received from a calling subscriber line circuit, and are also capable of detecting multifrequency signalling from touch tone telephones. The local registers 38 consist of a dial pulse acceptor, register storage, and register output and can be connected to a sender 46 for providing outpulsing. The registers 38 and senders 46 are controlled by a register common 48, to which they are connected on a time-division multiplex basis. The register common 48 is connected to a number-code translator 50 which provides information such as equipment number, ringing codes, and class of service information. The number-code translator 50 is connected to a line marker 58 and originating trunk marker 62 for purposes of effecting marking of line circuits and trunk circuits during the course of the establishment of a communication connection.

A ringing control 34 is connected in each terminating line from the output of the trunk link network 54 to the line link network 30 so that a ringing control is automatically connected to the terminating line circuit as soon as a connection to that line circuit is completed.

A line scanner circuit 56 continuously checks the line circuits **32*a*–32*n* to detect an off-hook condition. The line scanner circuit 56 is used for both originating and terminating types of functions. In the event of originating traffic, the line scanner stops when an off-hook condition is detected and transmits the information from its counter circuits to a line marker circuit to mark the particular line circuit 32*a*–32*n* and enables the SLN control 42 to initiate a path-finding operation between an available local register and the line circuit requesting service. In the event of terminating traffic, the line scanner is controlled by the number translator, wherein the line scanner receives an equipment number from the number translator to mark the line circuit 32*a*–32*n* having the particular equipment location. Furthermore, in terminating traffic, the line marker is also involved in transmitting the terminating subscriber class of service, ringing code, busy or idle status, and types of ringing required through the junctor control to the ringing control 34**.

For handling incoming trunk calls from an incoming trunk 60, there is provided a trunk junctor 64 which is essentially identical to the local junctor 36 but is connected between the incoming trunk 60 and the trunk link network 54. The trunk junctor 64 is connected through a trunk service link network 68 to the local registers 38 and register common 48. Path-finding through the trunk service link network 68 to a local register 38 is provided under control of the trunk service link network control 70. Path-finding through the trunk link network 54 is effected under control of the TLN control 82 in response to the junctor control 84. For purposes of detecting and marking incoming trunks 60 which request service, an originating trunk scanner 61 and originating trunk marker 62 are provided which connect to the trunk registers 38 and register common 48. For outgoing trunk calls from the exchange, a plurality of outgoing trunks 78 are provided at the output of the trunk link network 54, which trunks are selected and marked by an outgoing trunk marker 76 under control of the number-code translator 50. Special service trunks 80 are also connected to outputs of the trunk link network 54 and are marked from the outgoing trunk marker 76.

The operation of the telephone system of FIG. 1 for both local and trunk call is initially the same. The line scanner 56 in scanning the line circuits **32*a* through 32*n* detects a service request and seizes the line marker 58. The line marker 58 in turn actuates the SLN control 42 to start the path-finding through the service link network 40 from an available register 38. The line marker 58 marks the line circuit requesting service, and a path is obtained from the local register 38 through the service link network 40, and local junctor 36 and the line link network 30 to the marked line circuit. Dial tone is then returned to the line circuit from the local register 38, notifying the subscriber that he may commence dialing the line number of the called party. In the meantime, the line marker 58 passes on the equipment number of the calling circuit to the number-code translator 50, which number is then stored in the register (storage) 38. The register 38 also requests class of service information and the calling number identification from the number translator 50** at this time.

Upon receipt of the dialed information from the calling subscriber line, the register common 48 determines from the number dialed whether the call is to be a local call or trunk call. In the case of a local call, the number of the called party is translated in the number-code translator 50 to an equipment number and the line marker is seized so as to effect a marking of the called line in accordance with the equipment number derived from the translator. At this time, the junctor control 84 is seized from the line marker 58 and a switch-through signal is forwarded from the local register 38 through the local junctor 36 to the junctor control 84, initiating the termination of the local call. In response to the switch-through signal, the junctor control 84 actuates the TLN control 82 to start the path-finding operation through the trunk link network 54 from the local junctor 36 to the marked terminating line circuit. At this time, the ringing code for the called subscriber is forwarded from the number-code translator 50 through the line marker 58 and junctor control 84. To the ringing control 34. As soon as the called subscriber answers, the local junctor interconnects the calling and called line circuits.

The termination of a trunk call is similar to the termination of a local call, with the exception that an outgoing trunk is seized rather than a terminating line circuit. When it is determined that the call will be a trunk call, the outgoing trunk marker 76 is seized and the equipment number designating the trunk group is forwarded from the number-code translator 50 to effect a marking of the trunk group. The outgoing trunk marker 76 then seizes the junctor control 84 and the switch-through signal is forwarded from the local register 38 through the local junctor 36 to the junctor control 84 initiating operation of the TLN control 82 to perform path-finding through the trunk link network 54 from the local junctor 36 to the marked outgoing trunk 78.

Terminating calls from an incoming trunk 60 are handled very much like local calls. The originating trunk scanner 61 detects the request for service from an incoming trunk 60, seizes the originating trunk marker 62 which effects connection of a local register 38 through the trunk service link network 68 to a trunk junctor 64 connected to the incoming trunk 60. The number of the called subscriber line circuit is then received in the local register 38 and the equipment number of this line circuit is derived from the number-code translator 50. A terminating connection from the trunk junctors 64 through the trunk link network to the terminating line circuit is then effected in the same manner as described above in connection with the termination of a local call.

As can be seen from the foregoing description of the telephone system illustrated in FIG. 1, the junctors 36 and 64, along the junctor control 84, provide a fundamental part of the operation of the system controlling the interconnection of line circuits or trunks and line circuits. The junctor circuit in accordance with the present invention, which may be utilized either as a local junctor 36 or trunk junctor 64 is illustrated in detail in FIG. 2.

DETAILED DESCRIPTION OF THE LINE SCANNER AND MARKER

Figure 2:
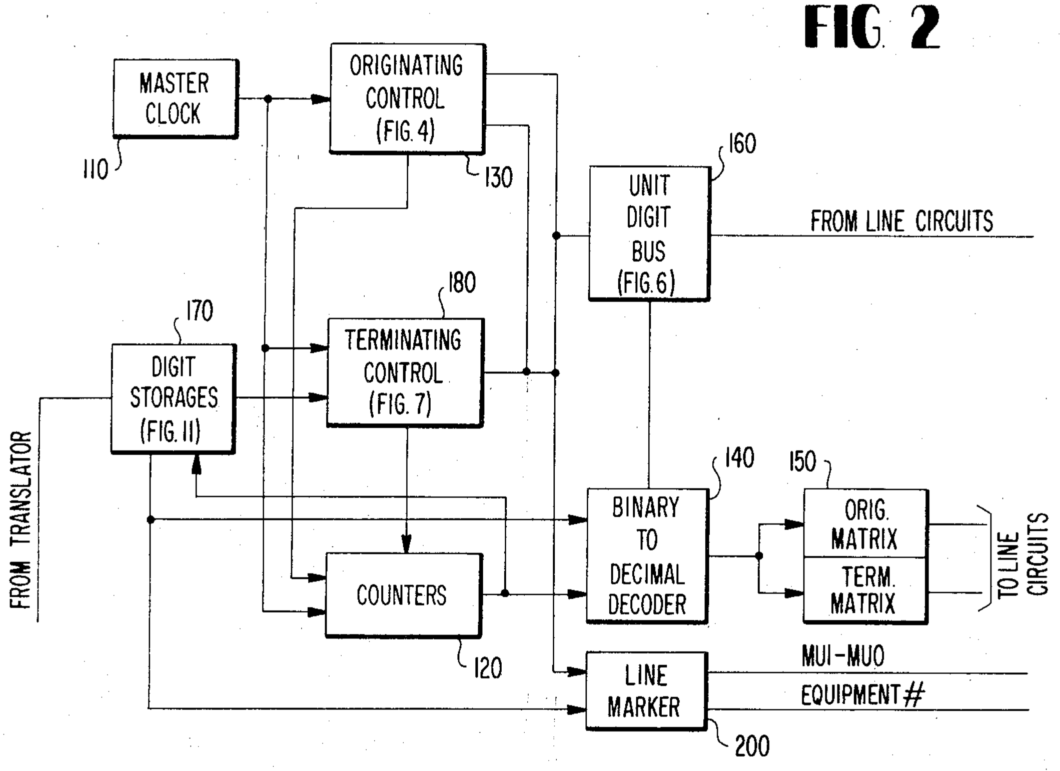
FIG. 2 is a block diagram of the line scanner and marker arrangement of the present invention.

FIG. 2 provides a schematic block diagram of the line scanner and marker arrangement of the present invention. The scanner operates from a master clock supplying a master clock pulse MCP, which is used to operate the decimal counters 120 for purposes of effecting scanning of the line circuits and also forms the basis for the generation of time slot signals TS1 through TS6, used to insure that the various operations performed by the scanner are carried out in the proper sequence. The master clock 110 also generates a clock pulse for use in the terminating control 180.

The counters 120, driven from the master clock 110 under control of the originating control 130, sequentially generate a binary count which is converted to sequential decimal values by the binary-to-decimal decoder 140, the output of which is applied to a matrix 150 which selectively marks sequential groups of line circuits with a mark potential in accordance with the numerical output provided from the decoder 140. When a request for service is detected, the mark potential applied to the group of line circuits is returned to the unit digit bus 160, which signals the counters 120 via the originating control 130 to stop the scanning of the groups of line circuits on the group from which a request for service was detected, and the originating control 130 then effects a scanning of the individual line circuits in the selected group via the counters 120 until the unit digit bus 160 detects a service request from a particular line circuit in the selected group which desires connection to a register. The equipment number of the selected line represented by the state of the stopped counters 120 is then shifted from the digit storage 170 to the line marker 200, which in turn transfers the equipment number to the registers for use in connection with other operations. The originating control 130 also signals the line marker to extend a mark to the selected line circuit so that path-finding between the line circuit and an available register can be carried out under control of the junctor control 84 and SLN control 42.

For terminating connections from a junctor or incoming trunk circuit to a called line circuit, the counters 120 are inhibited by the terminating control 180 and the equipment number of the line circuit is received from the number translator 50 and inserted into the digit storage 170. This equipment number is then transferred from the digit storage 170 through the binary-to-decimal decoder 140 to the matrix 150 which provides outputs marking the selected line circuit. At the same time, the terminating control 180 signals the line marker 200 so that a mark may be applied through the line circuit to the input of the line link network permitting path-finding from the marked junctor through the trunk link network to the marked line circuit. The terminating control also controls the termination to PBX lines, requesting repeated equipment numbers from the number translator 50 until an available line to the PBX is found.

The line scanner is normally scanning for an originating request from the line circuits. If a terminating request is received from the number of translator, the scanner is inhibited from looking for an originating request until the terminating call is completed. If an originating request has been found, stopping the scanning process, a terminating request is ignored until the originating call is completed. If all registers are busy, no originating requests are accepted.

Figure 4:
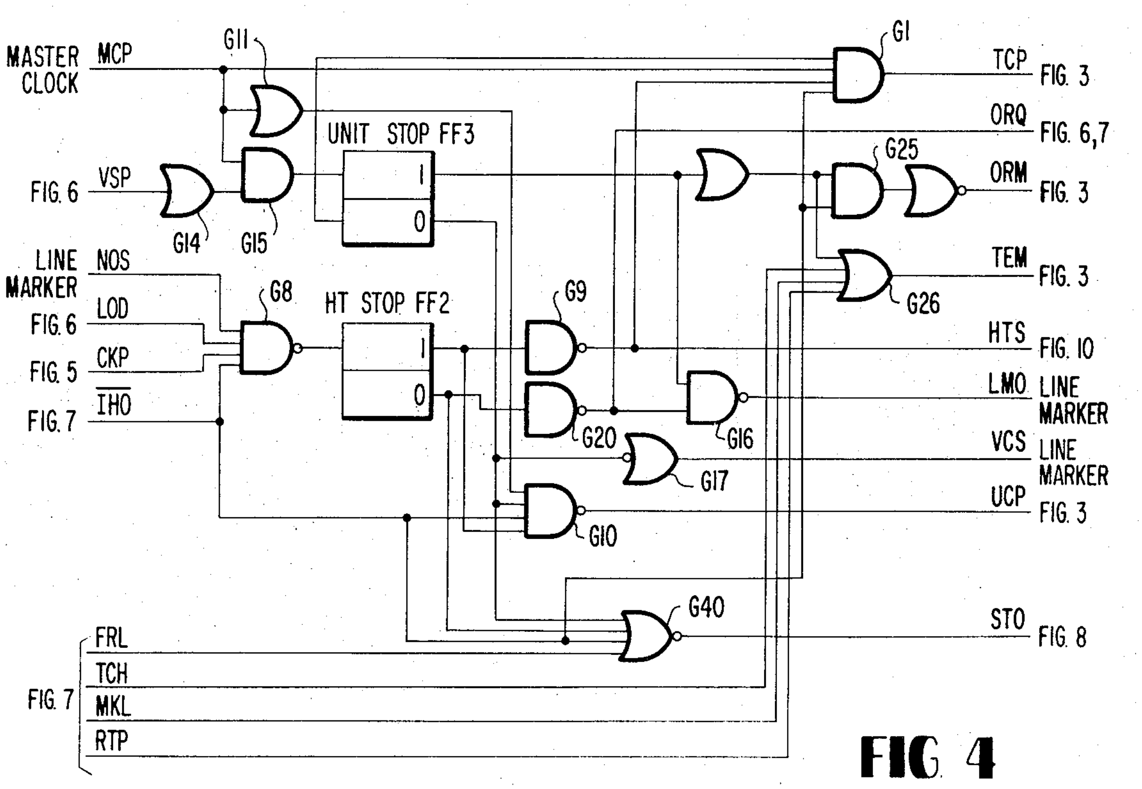
FIG. 4 is a schematic circuit diagram of the originating control circuit.

During the originating mode of operation when the line scanner is searching for a line circuit requesting service, the master clock pulse MCP is applied to gate G1 in FIG. 4, which gate will be open provided no internal release signal ITR or inhibit signal $\overline{IHO}$ is applied to the gate. With the gate G1 open, the master clock pulse signal is provided at the output of the gate as a tens clock pulse TCP which is applied to the tens counter C1 in FIG. 3. The line scanner units counter C3 is normally stopped and the hundreds counter C2 and tens counter C1 are normally running in search of an originating line service request. The tens clock pulse TCP drives the tens counter C1, an output of which is used to operate the hundreds counter C2.

The tens counter provides binary outputs TC1 through TC8, the hundreds counter C2 provides binary outputs HC1 through HC8, and the units counter provides binary outputs UC1 through UC8 to a binary-to-decimal decoder 140. The binary-to-decimal decoder 140 converts the binary inputs from the three counters C1, C2 and C3 into selected units, tens and hundreds decimal outputs on one of lines UD0–UD9, TD0–TD9, and HD0–HD9, respectively.

Figure 3:
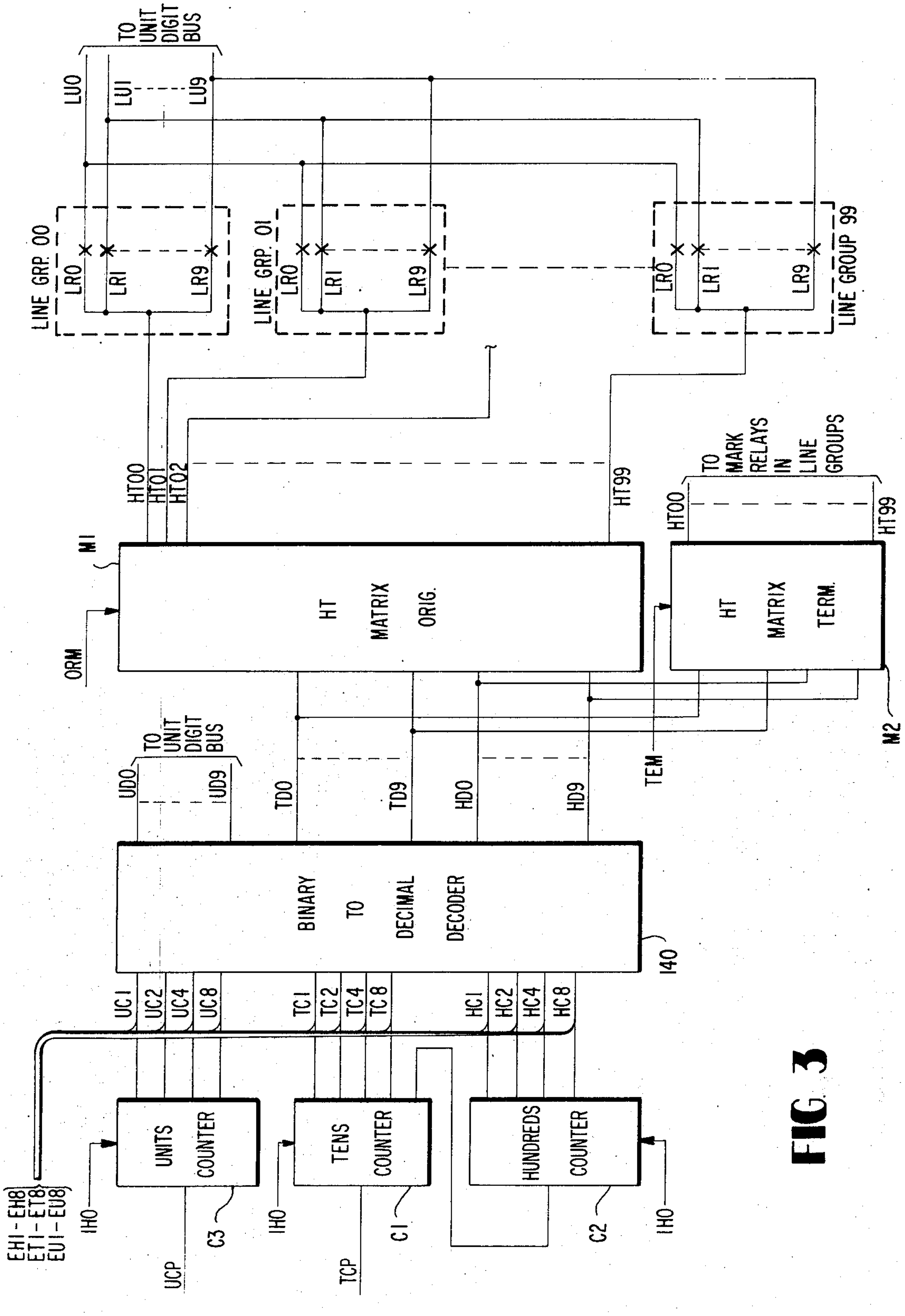
FIG. 3 is a schematic diagram of a portion of the arrangement of FIG. 2.

The units outputs UD0–UD9 are connected to the unit digit bus (FIG. 6) and will be used to scan one selected group of ten line circuits in a manner to be described more fully hereinafter. The tens and hundreds outputs TD0–TD9 and HD0–HD9 are connected to an originating hundreds-tens matrix M1 to place a ground pulse, consecutively, on one of the hundred-ten output lines HT00 through HT99 at a time, each representing one group of 10 line circuits. As can be seen in FIG. 3, the hundred-ten lead HT-- connected to each line group branches into 10 lines, each of which include the contacts of an individual line relay. Thus, if a subscriber goes off-hook the operation of the line relay associated with that line will close the contact LR- so as to complete a path from the HT-- lead to the respective one of the outputs LU0–LU9. Thus, when ground is placed on the particular HT-- lead during the scanning of the line groups, if one or more of the line relays in the line circuits associated therewith have been operated, one or more of the output lines LU0–LU9 will provide a ground output signal.

Figure 5:
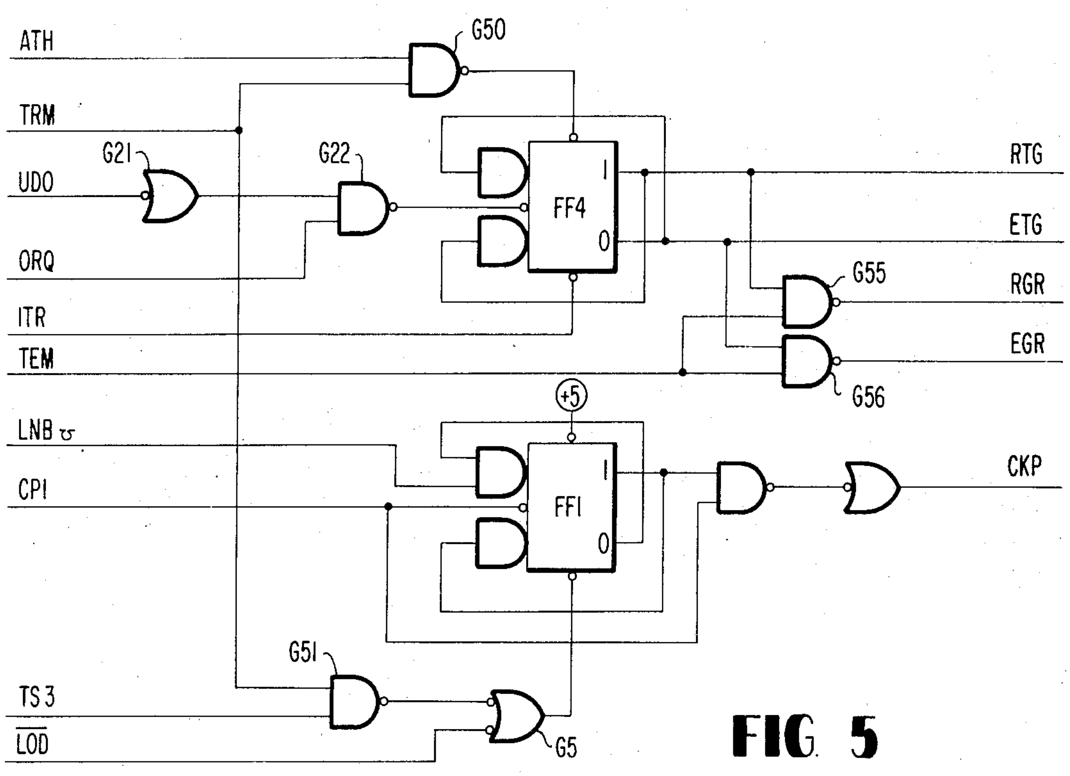
FIG. 5 is a schematic circuit diagram of a portion of the terminating control circuit.

The leads LU0–LU9 are connected to the unit digit bus (FIG. 6) where negative potential is connected to each of the lines through a respective diode. Thus, those input leads to the unit digit bus from the line groups which provide a ground indication will produce a current detected by a respective one of the sense amplifiers A1 through A10 connected thereto. If one or more of the amplifiers A1 through A10 provide an output in response to detection of a current on one or more of the input leads LU0–LU1, an output will be applied through one of the gates G2, G3 or G4, resulting in the generation of the line off-hook detect signals $\overline{LOD}$ and LOD. The signal $\overline{LOD}$ is passed through gate G5 in FIG. 5 to enable the setting of the check flip-flop FF1 by an incoming clock pulse signal CP1 derived from the master clock. If a line-busy signal LNB is received from the marker, the check flip-flop FF1 will be inhibited; however, if no line-busy indication is received, the clock pulse CP1 will set the check flip-flop FF1 producing a check pulse CKP. Depending upon the position of the clock pulse cycle, as provided by the master clock, when the signal $\overline{LOD}$ is received, a varying delay will occur before generation of the check pulse CKP. This guards against the stopping of the scanner by momentary grounds spikes from the line circuits.

The check pulse CKP is applied along with the line off-hook detect signal LOD to inputs of the gate G8 in FIG. 4, the output of which will set the HT stop flip-flop FF2, provided a signal NOS indicating no originating service is received from the line marker and an inhibit originating call signal $\overline{IHO}$ is received from the terminating control 180 at other inputs of the gate G8.

With the HT stop flip-flop FF2 set, the gate G1 will be inhibited from the output of gate G9, so that the tens clock pulse TCP will no longer be generated, thereby stopping the tens counter C1 and the hundreds counter C2. In other words, when a line group is scanned and a request for service from one of the 10 line circuits in that group is detected, the tens counter and hundreds counter are immediately stopped so that a ground mark is maintained on that line group. At the same time, the output of the set HT stop flip-flop FF2 will enable gate G10, permitting passage of the master clock pulse MCP from gate G11 as a unit digit clock pulse UCP, which is applied to the units counter in FIG. 3. As previously indicated, during the scanning of the groups of line circuits, the units counter normally is stopped and the hundreds and tens counters normally run in search of an originating line circuit requesting service. However, when a group is found containing a line circuit requesting service, the tens and hundreds counters stop at that line group and permit the units counter to run, thereby scanning the 10 line circuits which make up the selected line group.

Figure 6:
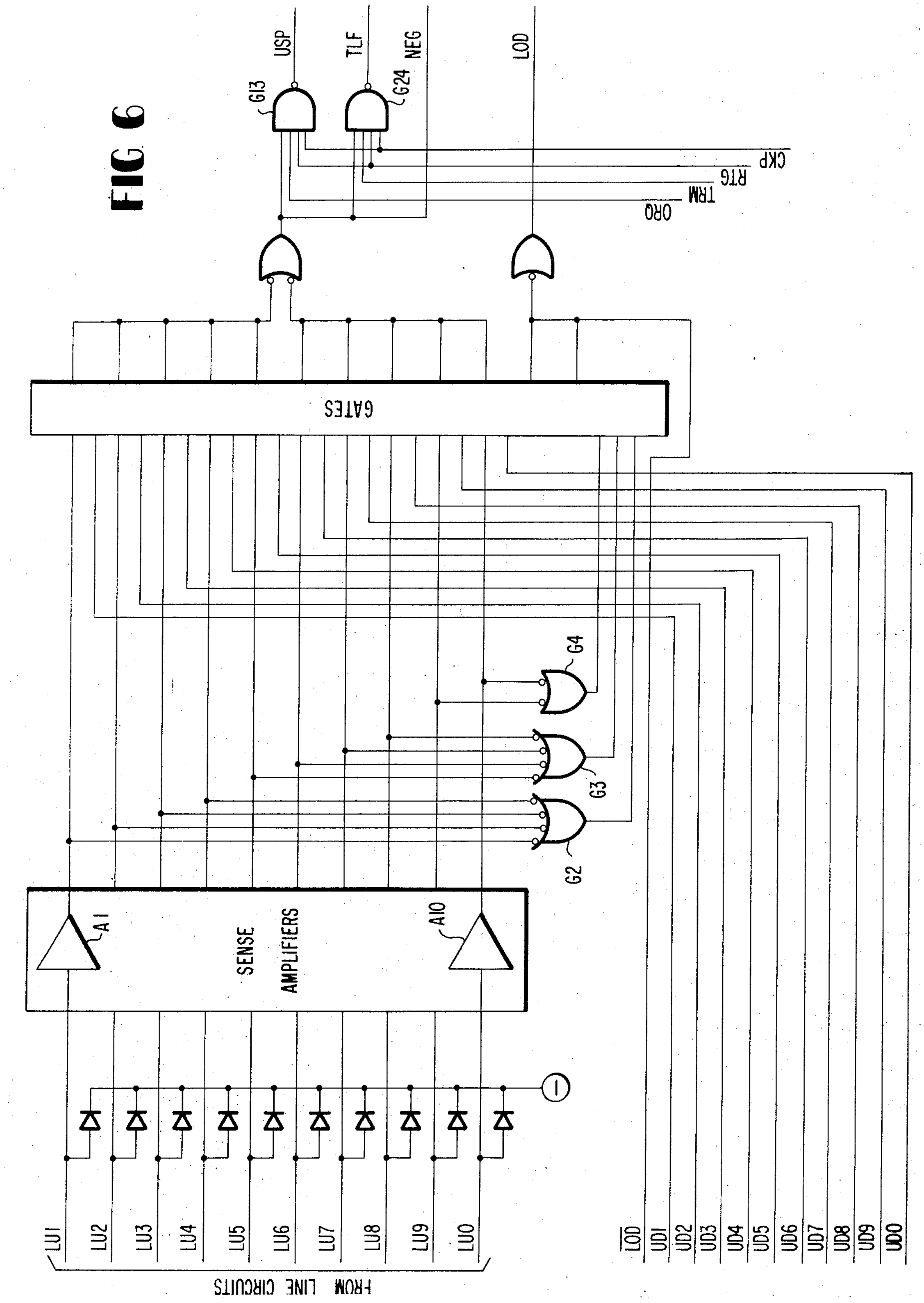
FIG. 6 is a schematic circuit diagram of a unit digit bus.

The outputs UD0 through UD9 from the binary-to-decimal decoder 140 produced by the operation of the units counter C3 are applied to the unit digit bus in FIG. 6 so as to be ANDed with the incoming lines LU0 through LU9 from the line group. In this way, the ten line circuits associated with the selected line group are scanned by the sequentially enabled outputs UD0–UD9. When a line from the line group providing a ground mark is scanned, a unit stop signal USP will be generated at the output of gate G13, which is enabled by the check pulse signal CKP, the regular thousand group signal RTG and the originating request signal ORQ. The units stop signal USP is applied through gate G14 to enable gate G15 in FIG. 4, thereby permitting the master clock pulse MCP to pass gate G15 to set the unit stop flip-flop FF3.

With both the HT stop flip-flop FF2 and the unit stop flip-flop FF3 set, gate G10 will be inhibited, thereby preventing generation of the unit digit clock pulse uCP so as to stop the units counter C3. At the same time, an output LMO is provided from the gate G16 to the line marker indicating that an originating line is to be marked. An output UCS is also provided from gate G17 to the line marker indicating that the units counter has stopped.

Figure 12:
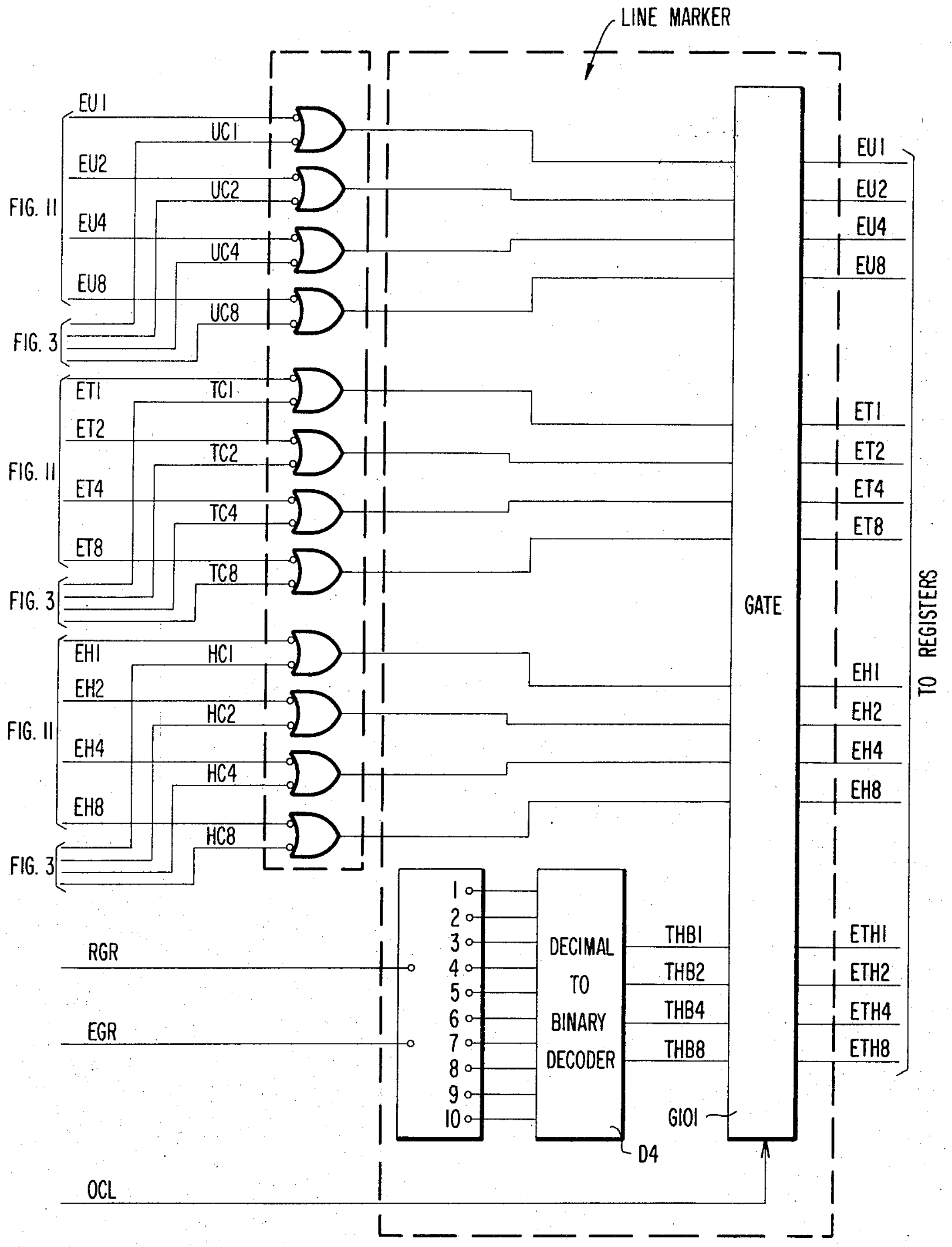

The position at which the counters have stopped represents the equipment number of the off-hook line selected. This equipment number is continuously applied to the line marker as seen in FIG. 12. The outputs UC1–UC8, TC1–TC8 and HC1–HC8 from the units, tens and hundreds counters, respectively, are applied through a gating arrangement in the line marker, which in turn applies the equipment number to the registers for further use thereby.

With the arrangement described, the scanning of one hundred groups of 10 line circuits can be accomplished, thereby effecting a scanning of 1,000 lines. However, the system can be expanded in accordance with the present invention to include the scanning of 2,000 line circuits with the same scanning cycle time by dividing the line circuits up into first and second thousand groups and providing a separate unit digit bus for each of the two groups of a thousand lines. The outputs from the HT originating matrix M1 (FIG. 3) are then connected in parallel to corresponding groups of 10 lines so that effectively the lines are scanned in groups of 20. When a group of 20 lines scanned from the output of the originating matrix M1 produces an indication of a line requesting service, the units counter is actuated as indicated above, but the first scan of the individual line circuits is applied only in the 10 line group in the first thousand group by enabling the unit digit bus associated with the first thousand group before the unit digit bus associated with the 10 line group in the second thousand group. If no line requesting service is detected in the first scan of the line group in the first thousand lines, a scan of the corresponding line group in the second thousand group is undertaken. The control which provides this selective scanning of the separate line groups in the regular thousand group and expanded thousand group of lines is effected by circuitry illustrated in FIGS. 4 and 5.

When the HT stop flip-flop FF2 is set from the output of gate G8, an output ORQ is provided from gate G20 indicating an originating request. When the units counter is started, the output UD0 applied through gate G21 in FIG. 5 to one input of gate G22 and the originating request signal ORQ applied to the other input of gate G22 will set the group indicating flip-flop FF4 providing an output RTG indicating the regular thousand group. As seen in FIG. 6, the unit digit bus associated with the regular thousand group is enabled by application of the signal RTG to the gates G13 and G25 thereof, so that the unit stop signal USP will be applied to the originating control circuit if a line is detected in the selected group of the regular thousand lines. On the other hand, if the scanner scrutinizes all 10 lines of the line group in the regular group of a thousand lines without detecting a request for service, the next cycle of the units counter will provide an output UD0 to the gate G21 in FIG. 5 once again, changing the state of the flip-flop FF4 so as to provide an output ETG, designating the expanded thousand group. This line is applied to the other unit digit bus (not shown) to enable that bus in the same manner as the one illustrated in FIG. 6. This second unit digit bus, which has a configuration similar to that of the one illustrated in FIG. 6, has its inputs connected to the second thousand group of line circuits. Thus, the second cycle of the units counter will scan the line circuits of the line group marked in the expanded thousand group of lines so that a line circuit requesting service can be detected.

At the time the units counter C3 is stopped by the setting of the unit stop flip-flop FF3 in response to the receipt of the unit stop signal USP from the units digit bus, gate G25 connected to the output of the unit stop flip-flop FF3 is blocked, removing the originating matrix control signal ORM and the gate G26 is enabled so as to generate a terminating matrix control signal TEM. As seen in FIG. 3, the originating HT matrix M1 and terminating HT matrix M2 are enabled by the originating and terminating matrix control signals ORM and TEM. Both the matrix M1 and the matrix M2 are connected in parallel to the tens and hundreds outputs TD0–TD9 and HD0–HD9 from the binary-to-decimal decoder 140. As already described, the outputs of the originating HT matrix M1 extend through the line groups to the lines LU0–LU9 so that closing of one of the line relay contacts in the group will permit the ground mark to extend through the group to the unit digit bus. The outputs HT00–HT99 from the terminating HT matrix M2 extended to the mark relays in the respective line groups and serve along with the mark extended from the line marker to mark the particular line which is requesting service. The manner in which this marking takes place will be described in greater detail hereinafter in connection with the line marker circuit.

In the terminating mode of operation of the line scanner, wherein the line scanner is to seek out and effect the marking by the line marker of a line circuit designated by the dialed digits received from a calling line circuit, no scanning of the line circuits is necessary since the equipment number of the desired line circuit can be supplied by the number translator. In order to effect the proper transfer of data from the number translator to the line scanner in proper time relationship, the number translator forwards to the line scanner, in addition to the information concerning the equipment number of the line circuit to be marked, a plurality of timing signals TP1 through TP6, which control the proper storage of the data received from the translator.

Figure 10:
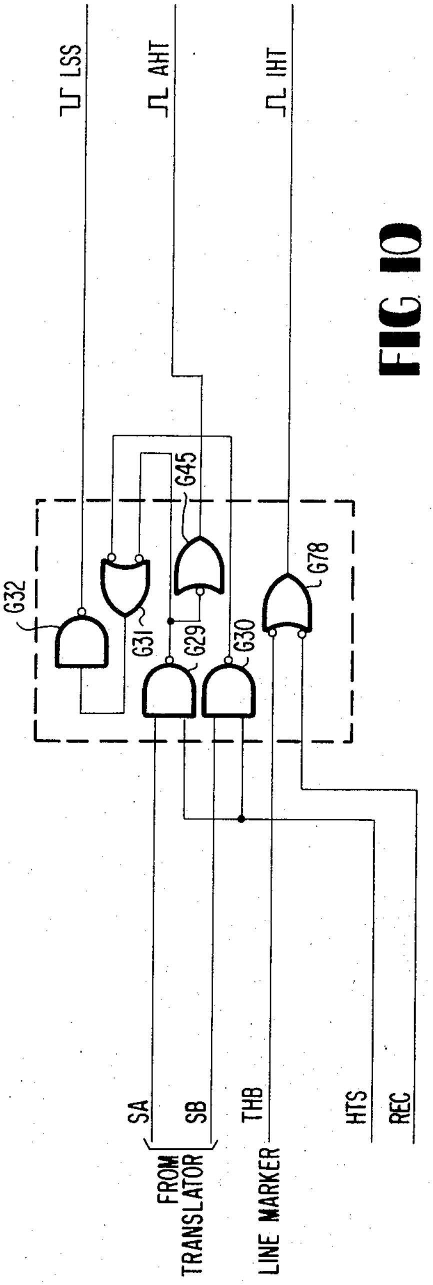
FIGS. 10, 11 and 12 are schematic circuit diagrams of the digit storages.

As already indicated, the line scanner will normally scan the line circuits to detect a request for service; however, if a terminating request is received from the number translator, the scanner will be inhibited from looking for an originating request until the terminating call is completed. If the scanner is in the process of looking for a line service request, the hundred-tens stop signal HTS will not be generated, so that gates G29 and G30 in FIG. 10 will be enabled by receipt of a signal SA or SB from the number translator indicating from the thousand digit which has been dialed whether the line circuit to be marked is in the regular thousand line group or the expanded thousand line group. An output from either of gates G29 or G30 will pass OR gate G31 and gate G32 to provide a line scanner seize signal LSS which enables the line scanner seizure flip-flop FF5 in FIG. 7. With the setting of the flip-flop FF5, a receive-information signal RIF and inhibit originating call signals IHO and $\overline{\text{IHO}}$ will be generated. The signal RIF is applied to FIG. 11 to enable gates G35–G38 to permit the data representing the equipment number in binary form to be applied via lines LB1–LB8 to the digit storages DS1–DS6 under control of the timing signals TP1–TP6. As seen from FIG. 11, the digit storages contain not only the equipment number of the line circuits to be marked, but also class of service signals CO1–CO4, ringing code signals RC1–RC4, a translator release signal FRC, and PBX and operator busy verification OBV indications. The equipment number in the digit stores is transmitted to the line marker, as already described in connection with FIG. 12.

Figure 8:
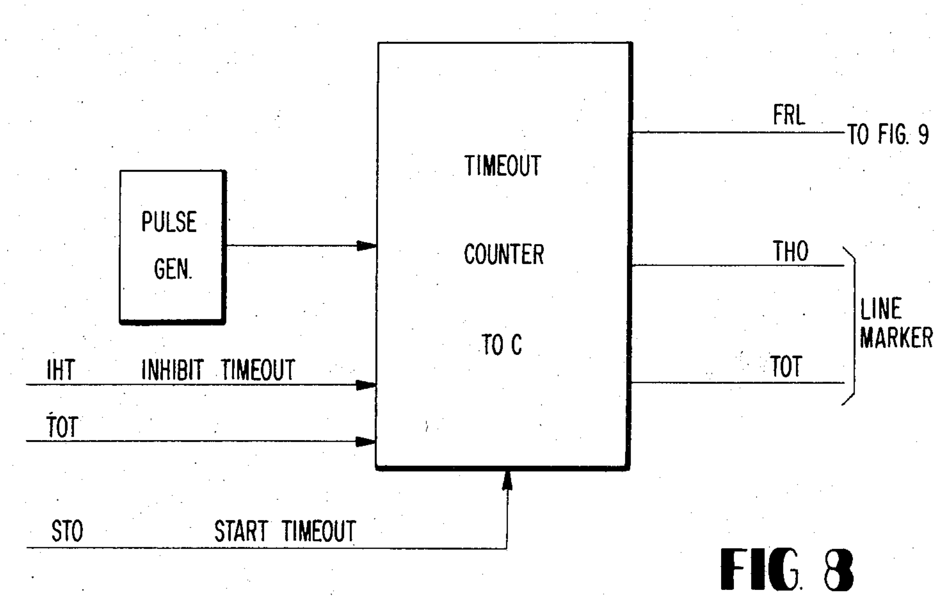
FIG. 8 is a block diagram of a time-out control.
Figure 7:
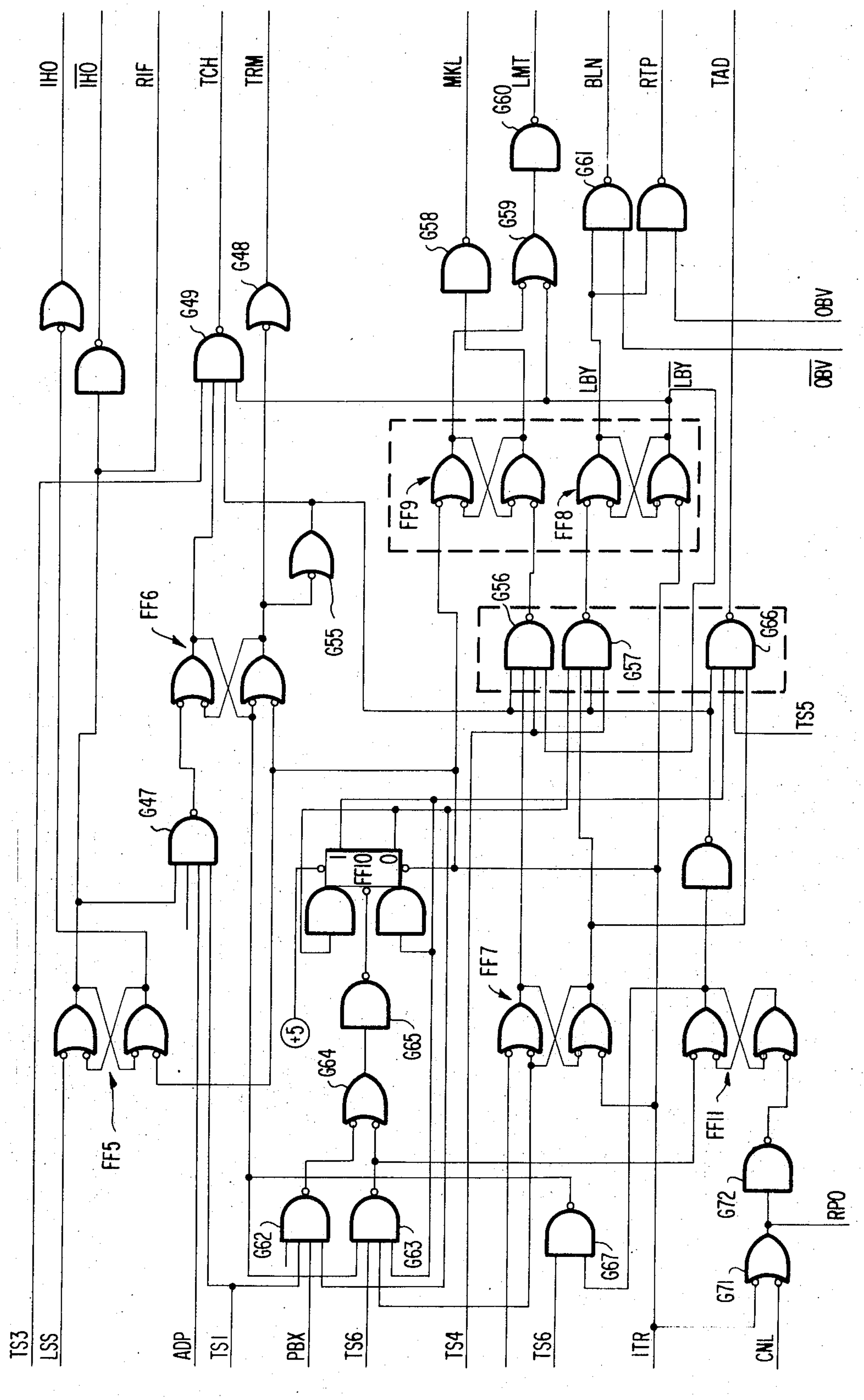
FIG. 7 is a schematic circuit diagram of another portion of the terminating control circuit.
Figure 11:
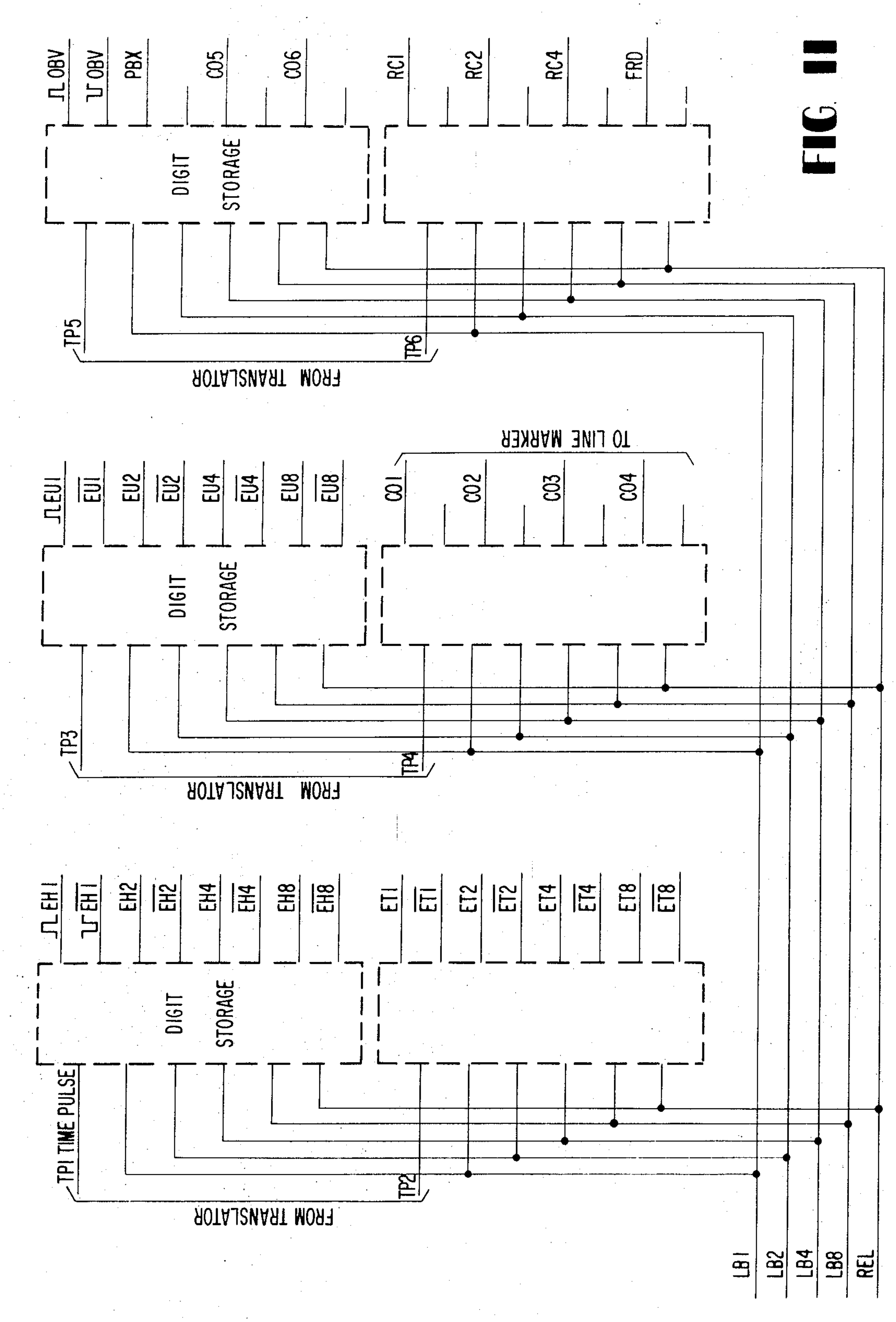

The inhibit originating call signal IHO, which is generated by setting of flip-flop FF5 in FIG. 7, is applied to inhibit the units counter, tens counter and hundreds counter so that no outputs are applied from these counters through either the originating HT matrix M1 or the terminating HT matrix M2. Since scanning of the line circuits is unnecessary in that the equipment number of the particular line circuit to be marked is available from the translator, the output of the counters are not needed during the terminating operation. Thus, the equipment number derived from the digit stores DS1–DS6 in FIG. 11 are applied to the inputs of the binary-to-decimal decoder 140. The inhibit originating call signal $\overline{\text{IHO}}$ is also applied to FIG. 4 where it inhibits gate G8 preventing setting of the HT stop flip-flop FF2, thereby preventing generation of the hundred-tens stop signal HTS, the units digit clock pulse UCP, the tens clock pulse TCP and the originating request signal ORQ. In addition, the gate G25 is inhibited so as to remove the originating matrix control signal ORM and the gate G40 is enabled permitting a start time-out signal STO which is applied to the time-out counter (FIG. 8).

Figure 9:
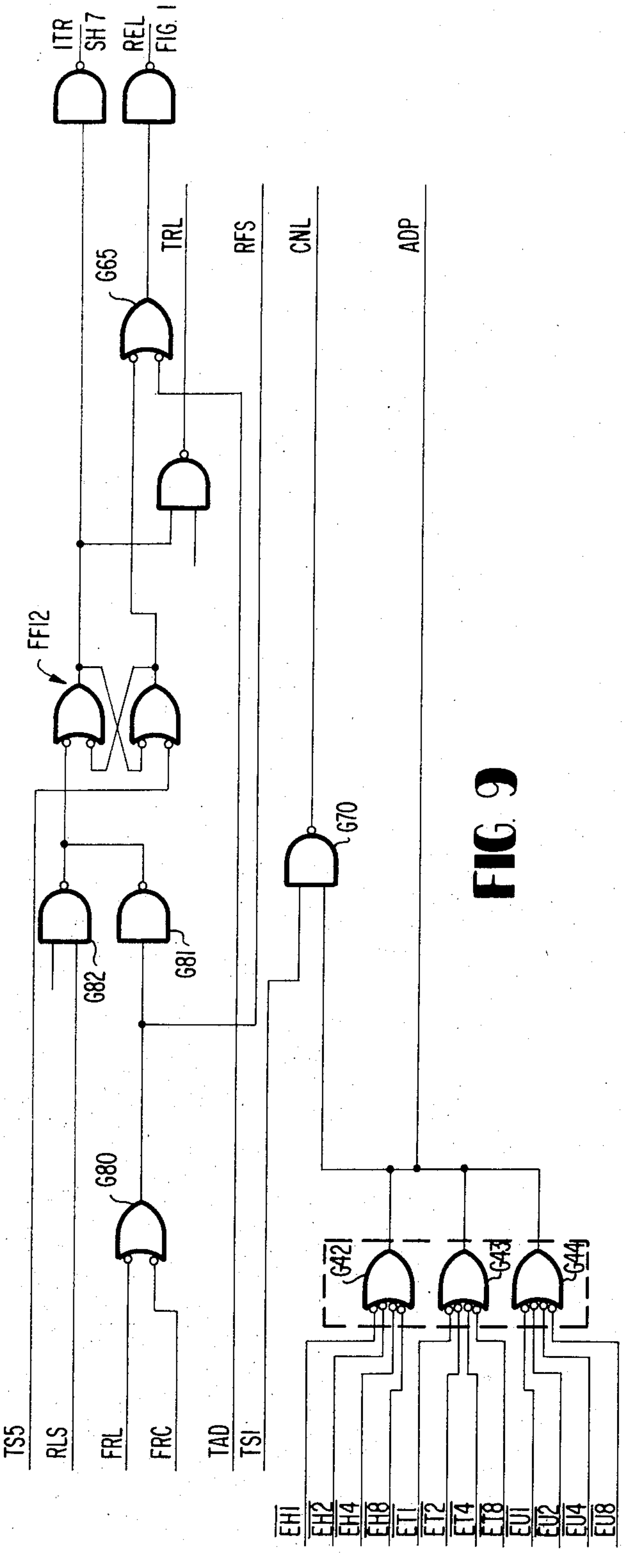
FIG. 9 is a schematic circuit diagram of another portion of the originating control.

The inhibiting of the originating request signal ORQ prevents the generation of the units stop pulse USP in the unit digit bus (FIG. 6) since gate G13 cannot be enabled and the removal of the originating matrix control signal ORM prevents the use of the originating HT matrix M1. Upon storage of the complete equipment number, an all-digits-present signal ADP is generated from the output of the gates G42–G44 in FIG. 9.

If the equipment number of the line to be marked is in the regular thousand group, as indicated by receipt of the signal SA from the translator (FIG. 10), a thousand signal ATH will be generated at the output of gate G45. On the other hand, if the equipment number of the line to be marked is in the expanded thousand group, as indicated by receipt of the signal SB from the translator, the signal ATH will not be generated. With the line scanner seizure flip-flop FF5 set in FIG. 7, receipt of the all-digits-present signal ADP, along with the first time slot signal TS1 from the master clock will enable gate G47, thereby setting the commence termination flip-flop FF6. The setting of the flip-flop FF6 will generate a terminate signal TRM via the gate G48, which signal is applied to the control circuitry in FIG. 5. If the signal ATH has been generated, the gate G50 will be enabled by generation of the terminate signal TRM, thereby setting the flip-flop FF4 to generate a regular thousand group signal RTG. On the other hand, if the signal ATH is not present when the signal TRM is generated, the thousands group flip-flop FF4 will remain reset, producing the expanded thousand group signal ETG. When time slot 3 is generated by the master clock, the gate G51 will be enabled, thereby enabling the flip-flip FF1 via the gate G5 so that the next clock pulse on line CP1 will produce generation of a check pulse CKP. Also with the setting of the commenced termination flip-flop FF6, a terminating check signal TCH is generated at the output of gate G49 in FIG. 7, which signal is applied to gate G26 in FIG. 4 generating the terminating matrix control signal TEM which enables the terminating HT matrix M2 in FIG. 3. Thus, the outputs from the binary-to-decimal decoder 140, providing data from the translator, are applied through the terminating HT matrix M2 so that a single output from this matrix will energize the mark relay in the line group associated with the line circuit to be marked. The terminating matrix control signal TEM is also applied to FIG. 5 to enable gate G55 and gate G56 to generate a regular group signal RGR or expanded group signal EGR, depending upon the state of flip-flop FF4. The signal RGR or EGR is applied to the marker, as seen in FIG. 12, where a strapping panel provides for the generation of the thousands digit.

The single enabled output from the terminating HT matrix M2 determined by the equipment number applied through the binary-to-decimal decoder 140 serves to actuate the mark relay in the line group associated with the line to be marked and also is applied to check the condition of the contact of the cut-off relay (not shown) in the line circuit for a busy or free condition. If the line is free, the mark will extend to the unit line LU-connected to the unit digit bus and will be detected by the appropriate one of the sense amplifiers A1–A10. With the terminating signal TRM, the check pulse signal CKP and the RTG or ETG signals generated, the gate G24, or corresponding gate in the other units digit bus (not shown) connected to the expanded thousand line group, will be enabled so as to generate a terminating line-free signal TLF. The signal TLF is applied to line-free flip-flop FF7 in FIG. 7, thereby setting the flip-flop so as to store the line-free condition. Removal of the time slot signal TS3 stops the generation of the terminating check signal TCH by opening gate G49 in FIG. 7 which in turn removes the terminating matrix control signal TEM at the output of gate G26 in FIG. 4 and stops generation of the terminating line-free signal TLF at the output of gate G24 in FIG. 6.

If the line is free, the set condition of the commenced termination flip-flop FF6 will enable gates G56 and G57 via gate G55 in FIG. 7, so that the output of the line-free flip-flop FF7 along with the line-not-busy output $\overline{LBY}$ from the flip-flop FF8 will set the mark line flip-flop FF9 at time slot TS4 from the output of gate G56. The output of the flip-flop FF9 will provide a mark line signal MKL via gate G58 which enables gate G26 to provide a terminating matrix control signal TEM to the terminating HT matrix M2 in FIG. 3. The set mark line flip-flop FF9 also provides a line marker terminating signal LMT to the line marker via gates G59 and G60. Once again, the appropriate mark relay in the line group including the line circuit to be marked is enabled from the output of the terminating HI matrix M2.

If the line circuit to be marked is busy, the line-free flip-flop FF7 will not be set so that upon setting of the commence-termination flip-flop FF6, the gate G57 will be enabled via gate G55 upon receipt of time slot TS4 with the result tat the line-busy flip-flop FF8 will be set. This will produce the generation of a busy line signal BLN via gate G61, which signal is forwarded to the line marker. In addition, the line marker terminating signal LMT is generated via gates G59 and G60, and this signal is also forwarded to the line marker along with the busy line signal BLN until release occurs.

When a PBX indication is received from the number translator (FIG. 11) as indicated by the digit storage DS5, gate G62 in FIG. 7 will be enabled at time slot TS1 to operate the PBX hunt flip-flop FF10. With the commence-termination flip-flop FF6 set, the terminate signal TRM is generated so that during a time slot TS3, the busy or free condition of the first PBX terminating line is checked in the same manner as described above for a regular terminating line. If the PBX line is busy, no action is taken during time slot TS4. However, a translator advance signal TAD is generated from gate G66 at time slot TS5 as a result of the indication at the input of this gate that the line-free flip-flop FF7 is not set and the PBX hunt flip-flop FF10 is set. The translator advance signal TAD is sent to the translator via the marker to order the translator to advance to the next PBX terminating line equipment number which, together with the PBX indication, will be subsequently sent to the scanner. The translator advance signal TAD is also applied in FIG. 9 to the input of gate G65 which generates release signal REL which is applied to FIG. 11 to clear all data from the digit storages, thereby enabling reception of the new PBX equipment number. Upon removal of time slot 5, the translator advance signal TAD and the release signal REL are removed.

With the commence-termination flip-flop FF6 set, the line-free relay FF7 not set, and the PBX hunt relay FF10 set, the stop PBX operation flip-flop FF11 will be set from the output of gate G63. At the same time, the output of gate G63 also operates the PBX hunt flip-flop FF10 via gates G64 and G65.

During the period after time slot TS6 is removed and before time slot TS1 is generated by the master clock, the flip-flop FF11 enables the generation of a ground pulse to gate G67 to reset the commence-termination flip-flop FF6, thereby removing the terminate signal TRM at the output of gate G48. A complete time slot cycle can occur before the new information from the translator is received and generated into the all-digits-present signal ADP in FIG. 9. The absence of the all-digits-present signal ADP and the setting of the commence-termination flip-flop FF6 prevents any signal generation during this period.

On generation of time slot signal TS1, the commence-termination flip-flop FF6 is set once again and the terminate signal TRM is generated while the PBX hunt flip-flop FF10 is set. The all-digits-present signal ADP and time slot signal TS1 applied to gate G70 in FIG. 9 result in the generation of a check-new-line signal CNL which produces a resetting of the stop PBX operation flip-flop FF11 via gates G71 and G72 in FIG. 7. Upon removal of time slot TS1, the check-new-line signal CNL ceases to be generated. When time slot TS3 appears, the busy or free condition of the next PBX terminating line checked as previously described. If this PBX terminating line is also busy, nothing occurs during time slot TS4 and the complete sequence TS5 to TS3 is repeated for each succeeding line. When a free line is found, the succession of events starting with TS4 is identical to that described above in connection with a free terminating line.

If all the PBX terminating lines, excluding the last one, are found to be busy, following the above-described sequence of operations, the translator will not send to the scanner a PBX indication for the last PBX terminating line. Starting with time slot TS1, the last PBX terminating line is then treated like an ordinary terminating line following the sequence described above for such operation.

A time-out function is provided by the line scanner and marker to prevent the line scanner from dwelling upon any originating or terminating operation without completing that operation within a given time. Whenever a hundred-ten stop signal HTS and units-counter stop signal UCS are generated on originating calls or an inhibit originating signal $\overline{IHO}$ is generated on terminating calls, a start-time-out signal is generated at the output of gate G40 in FIG. 4 and sent to the time-out counter TOC in FIG. 8. A time-out inhibit signal THB is received from the line marker in FIG. 10 and is applied through gate G78 as an inhibit signal IHT to the time-out counter TOC. The start-time-out signal STO enables the time-out counter to start the time-out count. If the originating or terminating call has not been completed during a predetermined period of time as determined by the counter, the counter will generate a time-out signal TOT and a time-out occurred signal THO, which signals are forwarded to the marker. If removal of the start-time-out signal, which clears the time-out counter, does not occur during the following period of time after generation of the time-out signal TOT, the time-out counter generates a forced release signal FRL which is applied to FIG. 9 through gates G80 and G81 to set the control release sequence flip-flop FF12. The setting of flip-flop FF12 generates a release signal ITR which is applied to reset the unit-stop flip-flop FF3 in FIG. 4. The output of gate G80 is also applied to the line marker as a release from scanner signal RFS. The inhibit signal IHT received from the line marker inhibits the time-out counter from receiving clock pulses thereby stopping the time-out. If the inhibit signal IHT is removed before the start-time-out signal STO, the time-out counter will resume the time-out counting. The duration of the time-out will be extended depending upon the position of the clock pulse cycle at the time of the removal of the inhibit signal IHT.

The scanner release sequence starts in FIG. 4 when a forced release signal FRL is generated, as described above, when a release line scanner signal RLS is received from the marker, or when a translator forced release signal FRC is received via the digit storage DS6 from the translator. All of these conditions will produce setting of the control release sequence flip-flop FF12 via gates G81 or G82. With the flip-flop FF12 set, a translator release signal TRL will be sent to the translator via the marker, a release signal REL will clear the digit storages DS1–DS6 in FIG. 11 and internal release signal ITR will clear the unit-stop flip-flop FF3 and hundred-ten stop flip-flop FF2. This also inhibits generation of a tens clock pulse at the output of gate G1.

In FIG. 7, the internal release signal ITR clears the commence-termination flip-flop FF6, the line scanner seizure flip-flop FF5, the line-busy flip-flop FF8, the line-free flip-flop FF7, and the stop PBX operation flip-flop FF11. The same signal also resets the mark line flip-flop FF9, the PBX hunt flip-flop FF10 in FIG. 7, and the thousands group flip-flop FF4 in FIG. 5. Enabling of gate G25 and inhibiting of gate G26 in FIG. 4 enables use of the originating matrix M1 and inhibits use of the terminating matrix M2 while resetting of the flip-flop FF5 in FIG. 7 removes the inhibit originating signals IHO and $\overline{IHO}$, thereby enabling the generation of the tens clock pulse via gate G1 while maintaining the stoppage of the units counter. The scanner is then ready for a new originating or terminating call seizure.

THE LINE MARKER the line marker works in conjunction with the line scanner to perform the actual marking of the line circuits requesting service on originating connections and terminating line circuits on terminating connections. As already indicated, while the line scanner hunts for a line service request, the line marker continuously receives equipment number signals from the scanner. When a line service request is found, the scanner stops and the position of scanner counters represents the equipment number of the off-hook line. A seizure signal is then received from the scanner initiating operation of the line marker.

Upon seizure, the line marker forwards seizure and line group selection signals to the SLN control to initiate selection of a register for connection through the service link network and an originating junctor to the calling line circuit on originating connections. For terminating connections, the marker sends a seizure signal, the class of service and ringing code to the junctor control to initiate connection from the output of the originating junctor through the trunk link network to a marked terminating line circuit. On both originating and terminating connections, the appropriate seizure signal received from the line scanner enables the units equipment number to send a marking battery to the appropriate line circuit so that path-finding to the line circuit can be initiated.

In one of the standard path-finding operations, through a link network, known as end-to-end marking, a mark battery is applied to one end of the link network and ground is sequentially applied to selective outputs of the network until a complete path is found by the detection of current flowing through the network between the marked inlet and outlet. Thus, in the case of originating connection, the line circuit requesting service is marked with battery and an available local register is marked with ground. Under control of the SLN control, a path is then found between the ground mark in the local register and the mark battery in the line circuit through the service link network, a local junctor and the line link network. For terminating connections, mark battery is applied from the terminating line circuit, and ground is applied from the output of the local junctor and the TLN control then proceeds to select an available path between the ground mark in the local junctor and the mark battery in the terminating line circuit.

Thus, the basic function of the line marker is to mark a line circuit designated by the line scanner so that the path-finding operations may be initiated under the control of the SLN control or the TLN control. As already indicated in connection with the description of the line scanner, on originating connections, the position of the scanner counters represents the equipment number of the line circuit requesting service. On terminating connections, the equipment number of the terminating line circuit is derived from the number translator which forwards this information through the line scanner to the line marker. The signals representing the equipment number are forwarded to the line marker as indicated in FIG. 12. The gating arrangement G100 forwards the units, tens, and hundreds digits in binary form to the line marker on leads UB1–UB8, TB1–TB8 and HB1–HB8, respectively. The units, tens, hundreds and thousands digits forming the equipment number of the marked line circuit are forwarded to the registers for use in connection with other operations and various special features. The thousands digit is generated within the line marker by use of a strapping panel to which is applied from the line scanner the regular group signal RGR or the expanded group signal EGR. The strapping panel then generates the particular thousand digit associated with the regular group or the expanded group on one of the 10 output lines therefrom, which lines are applied to the decimal-to-binary decoder D4 which provides the binary designation for the thousands digit in the form of outputs THB1–THB8. The outputs from the decoder D4 are applied to the gate G101 which transfers the equipment number to the registers in response to the receipt of originating call control signal OCL.

Figure 13:
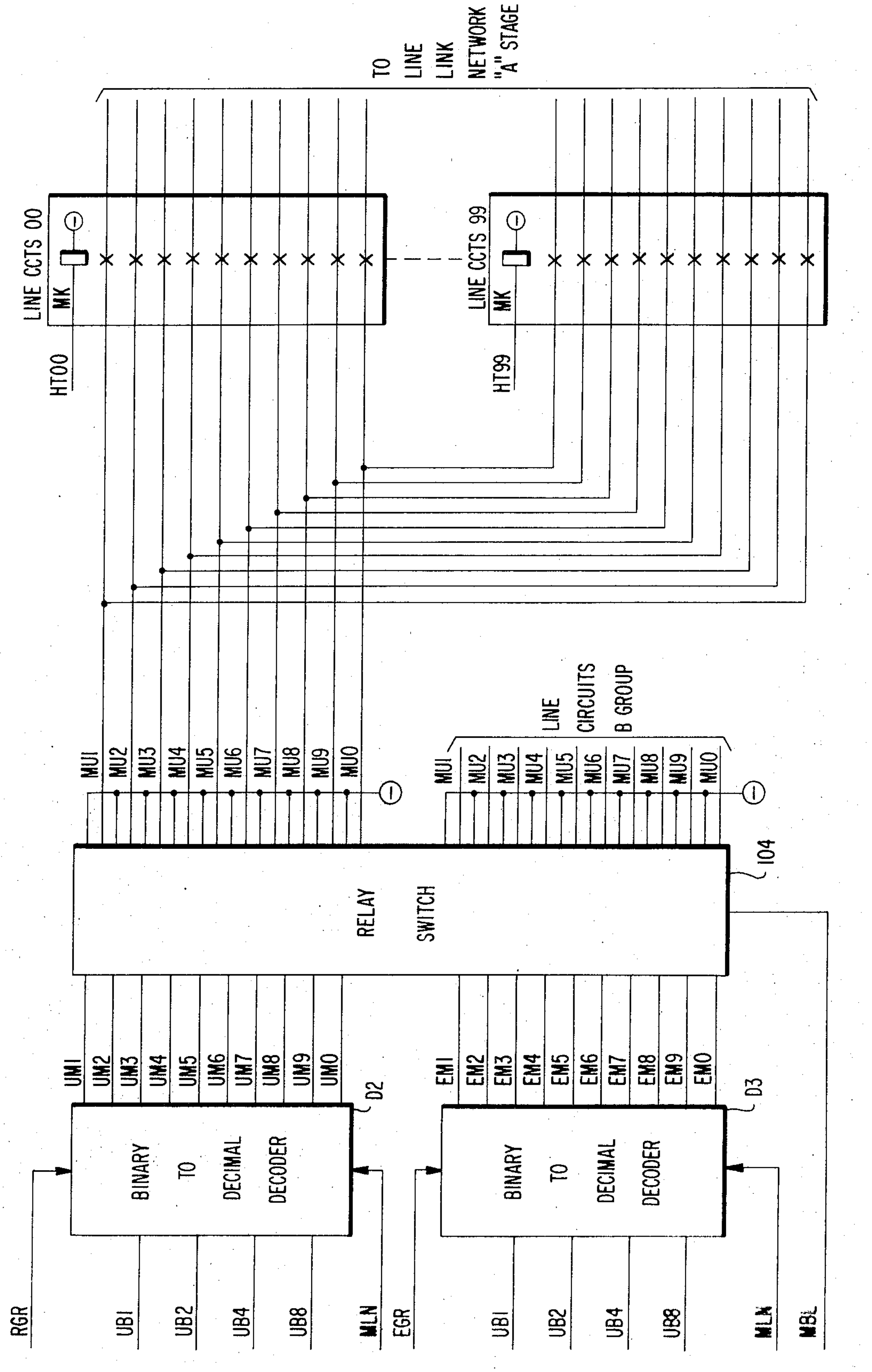
FIG. 13 is a schematic diagram of a portion of the marker arrangement of the present invention.

The units digit of the line circuit to be marked represented by the binary signals UB1–UB8 received from the line scanner are also applied to a pair of binary-to-decimal decoders D2 and D3 in FIG. 13. In response to receipt of the regular group signal RGR from the line scanner and the mark line control signal MLN from the marker control (FIG. 14), the binary designation of the units digit will be converted to a decimal output on one of the lines UM1–UM0 extending to a relay switch 104. Upon generation of a mark battery lead signal MBL in the marker control, the relay switch 104 will place mark battery on one of the lines MU1–MU0 extending to all of the groups of line circuits in the regular thousands group. In each of the groups of line circuits, there is provided a mark relay having contacts in each of the ten lines from the relay switch 104, so that operation of the one of the selected mark relays associated with one of the line groups will open the contacts in the lines MU1–MU0 passing through this group of line circuits. The ground signal which operates a selected one of the mark relays is derived from the output of the terminating HT matrix M2 in the line scanner (FIG. 3). Thus, if the hundreds, tens, and units digits of a selected line circuit to be marked are 995, respectively, a ground mark will be received from the terminating HT matrix M2 on lead HT99 to actuate the mark relay therein so as to close all of the contacts associated with that relay in the group of line circuits 99. At the same time, the binary designation of the units digit 5 will be received from the line scanner at inputs to the binary-to-decimal decoder D2 if the line circuit is part of the regular thousands group or at the inputs of the binary-to-decimal decoder D3 if the line circuit is part of the expanded thousands group. In either case, mark battery will be applied to the lead MU5 at the output of the relay switch 104, and since the mark relay in the group of line circuits 99 has been operated, the mark battery will extend through the line circuit on lead MU5 to an input of the line link network.

Figure 14:
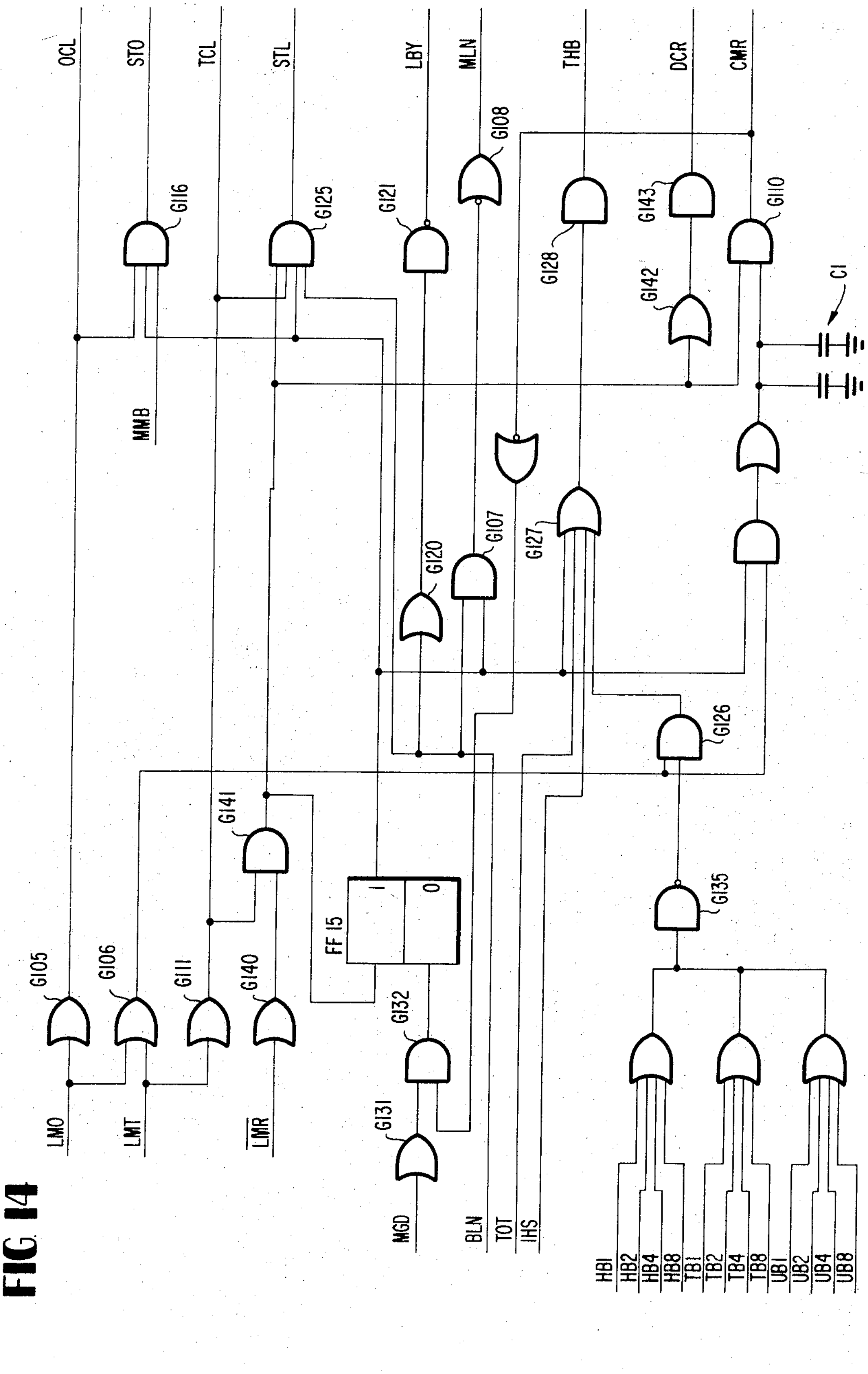
FIGS. 14, 15 and 16 are schematic circuit diagrams of the marker control circuit.
Figure 15:
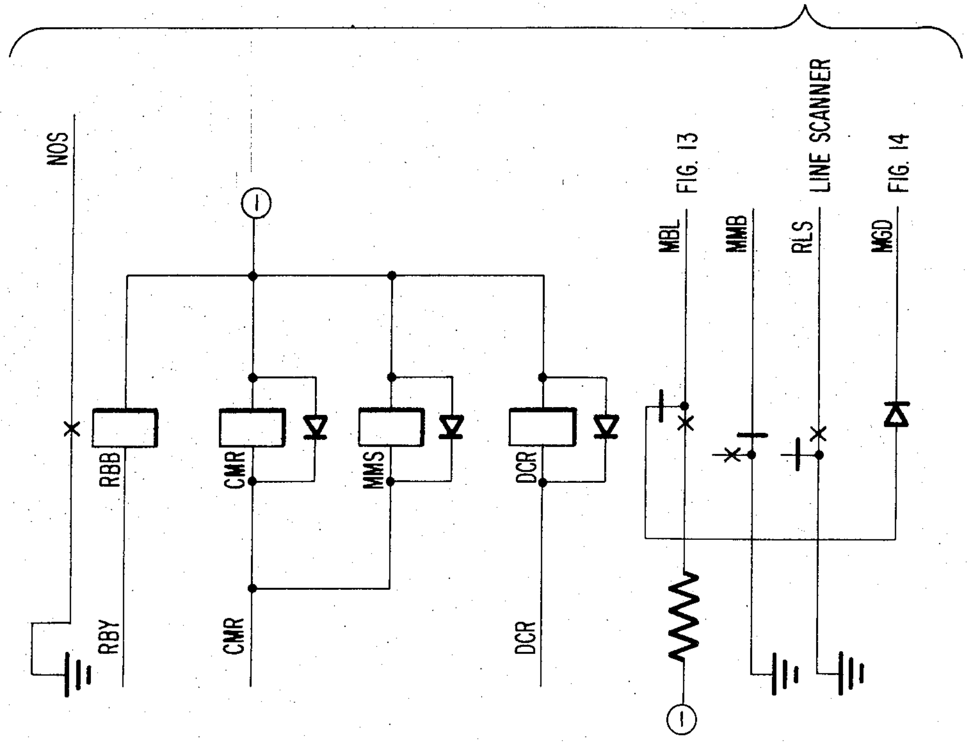

The generation of the necessary control signals to effect marking of a line circuit as described above is performed by the marker control circuitry illustrated in FIGS. 14 and 15. Receipt of a line marker originating signal LMO from the line scanner (FIG. 4) or a line marker terminating signal LMT from the line scanner (FIG. 7) will pass gate G106 in FIG. 14 and be applied to an input of gate G107. So long as a busy line signal BLN is not received from the line scanner, the gate G107 will be enabled so as to provide an output through gate G108 in the form of a marked line signal MLN. As indicated above, the mark line signal MLN is applied to the binary-to-decimal decoders D2 and D3 in FIG. 13, so as to enable the decoders to decode the binary representation of the units digits corresponding to the line circuit to be marked, which digit information is received from the line scanner. After an appropriate delay provided by the capacitor arrangement C1, the output of gate G106 will generate a connect-mark-battery-ground signal CMR at the output of gate G110. The ground signal CMR is applied to the operate winding of relay CMR in FIG. 15 to operate the relay. Operation of relay CMR closes the contacts of this relay in the mark battery lead MBL, placing negative battery on the line to the relay switch 104 in FIG. 13.

Figure 16:
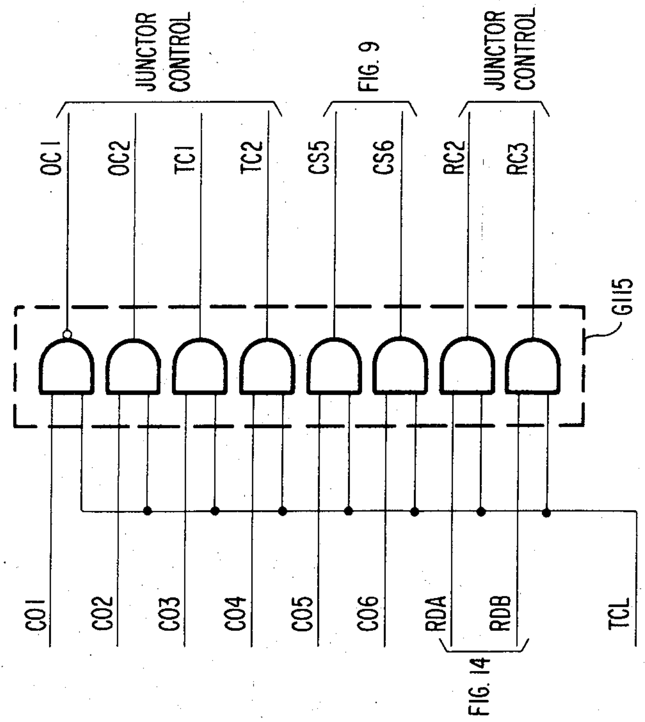

The line mark originating signal LMO from the line scanner is also applied through gate G105 as an originating call signal OCL which serves as a control signal to operate the gate G101 in FIG. 12, transferring the equipment number of the marked line circuit to the registers. On terminating calls, receipt of the line marker terminating signal LMT from the line scanner enables gate G111 to provide a terminating call signal TCL which is connected to the gating arrangement G115 in FIG. 16, which gating arrangement serves to transfer the class of service data and ringing code to the junctor control in connection with terminating calls.

When the mark battery signal MBL has been generated as a result of operation of the relay CMR, thereby applying mark battery on one of the lines from the relay switch 104 to the groups of line circuits, a monitor mark battery relay MMB is also operated from the ground applied to lead CMR in FIG. 15. Operation of this relay removes ground from the lead MMB extending to the gate G116 in FIG. 14, thereby permitting the output of gate G105 to enable that gate generating an originating start signal STO which extends to the SLN control and serves to start the path-finding operation under control of this circuit.

If, during the check of the line circuit to be marked during the course of setting up a terminating connection, it is found that the line is busy, an output BLN will be provided from gate G61 in the line scanner (FIG. 7), which signal will be applied to gates G107, G120 and G125 in the line marker (FIG. 14). During the process of establishing a terminating connection, the line marking terminate signal LMT from the line scanner will be applied via gate G111 to the input of gate G125, which, if enabled, will generate a start terminate signal STL. The start terminate signal STL is forwarded to the junctor control and serves to initiate the procedure for establishing the terminating connection through the trunk link network. However, if the terminating line is found to be busy as indicated by the signal BLN at the input of gate G125, this gate will be inhibited and the start terminate signal STL will not be generated. The busy line signal BLN also is applied through gates G120 and G121 to the junctor control as signal LBY, indicating to the junctor control that the terminating line is busy. The same busy-line signal BLN also inhibits gates G107 and thereby prevents the generation of the mark line signal MLN so that the units digit information from the line scanner will not be processed by the decoders D2 or D3.

During the course of transfer of the equipment number from the line scanner to the line marker, if all digits are not received, an output will be provided from gate G135 in FIG. 14 to the input of gate G126 which is enabled by the output of gate G106 upon receipt of the signals LMO or LMT. If gate G127 receives an output from gate G126 indicating that all digits have not been received, if a time-out signal TOT is received from the line scanner, or if an inhibit line scanner signal IHS is received from the line scanner at the input of gate G127, the gate will be enabled providing an output THB to the line scanner in FIG. 10 indicating that all time-outs are to be inhibited.

As seen in FIG. 15, so long as relay CMR is not actuated, indicating that mark battery has not been applied to the line circuits, the mark battery lead MBL will be connected via the normally closed contacts of the non-actuated relay along line MGD to gate G131 in FIG. 14. This connections detects false ground signals, which signals when applied through gates G131 and G132 will set flip-flop FF15. The output from the flip-flop FF15 is then applied to inhibit gates G116, G125 and G110 preventing the generation of the start-originating signal STO to the SLN control, the start signal STO to the junctor control and the connect-mark-battery signal CMR.

In the case where all of the registers available in the system are busy, a detecting circuit provides an all-register-busy signal RBY in FIG. 15, actuating the relay RBB. With actuation of this relay, ground is connected through the closed contacts of the actuated relay to the line NOS to the line scanner (FIG. 4) to indicate that no originating service is to be provided. In addition, where a fault circuit associated with the line marker detects a fault condition in the operation of the marker, a signal $\overline{LMR}$ will be received via gate G140 in FIG. 14 and will be applied via gates G141, G142 and G143 as a disconnect signal DCR to FIG. 15. The ground signal DCR will actuate the DCR relay closing contacts to connect ground on the release scanner line RLS to the line scanner. This same signal will also inhibit the gate G110, preventing generation of the connect-mark-battery signal CMR.

While the present invention has been described in conjunction with a particular automatic telephone system, it should be apparent that other systems can be equally served by the line scanner and marker arrangement described herein. Thus, it is to be clearly understood that this description is to be taken only by way of example and not as a limitation on the scope of the invention.

What is claimed is:

1. In an automatic telephone system for effecting communication connections between selected ones of a plurality of line circuits, a line scanner and marker arrangement comprising group scanning means for successively generating a scanning signal on respective scanning lines, each scanning line being connected to a respective group of line circuits and extending in common to each of the line circuits of the group, unit digit means connected to a plurality of unit digit lines for detecting a scanning signal on any one of said unit digit lines, each unit digit line being connected to a corresponding line circuit in each group of line circuits, service requesting means in each line circuit for connecting the scanning line of the group to the unit digit line of the particular line circuit in response to a subscriber request for service, unit scanning means operable in response to said unit digit means for scanning said unit digit lines to detect a scanning signal on one of said unit digit lines, and marking means for applying a marking signal to a line circuit designated by said group scanning means and said unit scanning means.

2. An arrangement as defined in claim 1, wherein said unit digit means includes first detecting means connected to said unit digit lines for inhibiting said group scanning means upon detection of a scanning signal on any line and second detecting means connected to said unit digit lines and said unit scanning means for inhibiting said unit scanning means upon detection of a scanning signal on a single unit digit line.

3. An arrangement as defined in claim 2, wherein said group scanning means includes tens and hundreds counters providing tens and hundreds identification signals and matrix means responsive to said tens and hundreds identification signals for successively generating a scanning signal on respective scanning lines to the respective groups of line circuits.

4. An arrangement as defined in claim 1, wherein said unit digit means includes sensing means for detecting a scanning signal on one of said unit digit lines and means responsive to said sensing means for generating a line demand signal for use in control of said group scanning means and said unit scanning means.

5. An arrangement as defined in claim 4, further including originating control means responsive to said line demand signal for inhibiting said group scanning means and actuating said unit scanning means, said unit digit means further including gating means having a gate in each unit digit line sequentially enabled by said unit scanning means for generating a stop scan signal upon detection of a scanning signal at the output of one of said gates, said stop scan signal being applied to inhibit said unit scanning means.

6. An arrangement as defined in claim 5, wherein said group scanning means includes tens and hundreds counters providing tens and hundreds identification signals and matrix means responsive to said tens and hundreds identification signals for successively generating a scanning signal on respective scanning lines to the respective groups of line circuits.

7. An arrangement as defined in claim 6, wherein said service requesting means includes a line relay having contacts in a line connecting the scanning line of the group to one of the unit digit lines, said line relay being actuated in response to a subscriber going off-hook.

8. An arrangement as defined in claim 7, wherein each line circuit further includes a mark line extending outside of said line circuit and each group of line circuits includes a mark relay having contacts in each mark line of the groups of line circuits, said matrix means including an originating matrix selectively connected to said group scanning means and said scanning lines and a terminating matrix selectively connected to said group scanning means and the mark relays in said groups of line circuits, said originating control means including means responsive to said stop scan signal for switching the outputs of said group scanning means from said originating matrix to said terminating matrix.

9. An arrangement as defined in claim 8, wherein said marking means includes switch means responsive to generation of said stop scan signal for applying a marking signal to the mark lead in each group of line circuits corresponding to the designation of said unit scanning means, the mark relay associated with a single group of line circuits being actuated from the output of said terminating matrix so that only a single mark lead is enabled by said marking signal.

10. In an automatic telephone system for effecting communication connections between selected ones of a plurality of line circuits, a line scanner and marker arrangement comprising first scanning means for scanning said plurality of line circuits sequentially in groups of line circuits by application of scanning signals thereto, first detecting means for detecting requests for service from one or more line circuits of a group of line circuits scanned by said first scanning means by detecting the scanning signal at least on one of the outputs thereof, control means responsive to said detecting means detecting a request for service for stopping said first scanning means, second scanning means responsive to said control means for sequentially scanning the individual line circuits of the group of line circuits scanned by said first scanning means, second detecting means responsive to a request for service from a single line circuit of said group for stopping said second scanning means, and marking means for applying a marking signal to the single line circuit designated by the position of the stopped first and second scanning means.

11. An arrangement as defined in claim 10, wherein said first scanning means includes tens and hundreds counters providing tens and hundreds identification signals and matrix means responsive to said tens and hundreds identification signals for successively generating a scanning signal on respective scanning lines to the respective groups of line circuits.

12. An arrangement as defined in claim 11, wherein respective scanning lines from said first scanning means extend to each group of line circuits, which scanning lines extend through each line circuit of the group to outgoing unit digit lines.

13. An arrangement as defined in claim 12, wherein said first detecting means includes sensing means for detecting a scanning signal on one of said unit digit lines and means responsive to said sensing means for generating a line demand signal for use in control of said first scanning means and said second scanning means.

14. An arrangement as defined in claim 13, wherein said control means is responsive to said line demand signal for inhibiting said first scanning means and actuating said second scanning means, said first detecting means further including gating means having a gate in each unit digit line sequentially enabled by said second scanning means for generating a stop scan signal upon detection of a scanning signal at the output of one of said gates, said stop scan signal being applied to inhibit said second scanning means.

15. An arrangement as defined in claim 12, further including a line relay having contacts in a line connecting the scanning line of the group to one of the unit digit lines, said line relay being actuated in response to a subscriber going off-hook.

16. An arrangement as defined in claim 12, wherein each line circuit includes a mark line extending outside of said line circuit and each group of line circuits includes a mark relay having contacts in each mark line of the group of line circuits, said matrix means including an originating matrix selectively connected to said first scanning means and said scanning lines and a terminating matrix selectively connected to said first scanning means and the mark relays in said groups of line circuits, said control means including means responsive to said stop scan signal for switching the outputs of said first scanning means from said originating matrix to said terminating matrix.

17. An arrangement as defined in claim 16, wherein said marking means includes switch means responsive to generation of said stop scan signal for applying a marking signal to the mark lead in each group of line circuits corresponding to the designation of said unit scanning means, the mark relay associated with a single group of line circuits being actuated from the output of said terminating matrix so that only a single mark lead is enabled by said marking signal.

18. An arrangement as defined in claim 16, further including translator means for providing to said marker means and said terminating matrix the numerical indication of a line circuit to be marked, said control means including means responsive to said translator means for inhibiting operation of said tens and hundreds counters and said second scanning means.

19. In an automatic telephone system for effecting communication connections between selected ones of a plurality of line circuits, a line scanner and marker arrangement comprising:

group scanning means for successively generating a scanning signal on respective scanning lines, each scanning line being connected to two respective groups of line circuits and extending in common to each of the line circuits of the two groups, first and second unit digit means each connected to a respective plurality of unit digit lines for detecting a scanning signal on any one of the unit digit lines associated therewith, service requesting means in each line circuit for connecting the scanning line of the group to the unit digit line of the particular line circuit in response to a subscriber request for service, unit scanning means for scanning the unit digit lines of said first and second unit digit means to detect a scanning signal on one of said unit digit lines, control means responsive to detection of a scanning signal on a unit digit line of said first or said second unit digit means for stopping said group scanning means and actuating said unit scanning means, including sequence control means for connecting said unit scanning means first to said unit digit lines of said first unit digit means and then to the unit digit lines of said second unit digit means, detecting means responsive to detection of a scanning signal on a unit digit line scanned by said unit scanning means for stopping said unit scanning means, and marking means for applying a marking signal to the single line circuit designated by the outputs of said stopped group and unit scanning means.

20. An arrangement as defined in claim 19, wherein said service requesting means includes a line relay having contacts in a line connecting the scanning line of the group to one of the unit digit lines, said line relay being actuated in response to a subscriber going off-hook.

21. An arrangement as defined in claim 20, wherein each line circuit further includes a mark line extending outside of said line circuit and each group of line circuits includes a mark relay having contacts in each mark line of the group of line circuits, and matrix means including an originating matrix selectively connected to said group scanning means and said scanning lines and a terminating matrix selectively connected to said group scanning means and the mark relays in said groups of line circuits, said control means including means responsive to the stopping of said unit scanning means for switching the outputs of said group scanning means from said originating matrix to said terminating matrix.

22. An arrangement as defined in claim 21, wherein said marking means includes switch means responsive to the stopping of said unit scanning means for applying a marking signal to the mark lead in each group of line circuits corresponding to the designation of said unit scanning means, the mark relay associated with a single group of line circuits being actuated from the output of said terminating matrix so that only a single mark lead is enabled by said marking signal.

23. An arrangement as defined in claim 19, wherein each of said unit digit means includes sensing means for detecting a scanning signal on one of said unit digit lines and means responsive to said sensing means for generating a line demand signal for use in control of said group scanning means and said unit scanning means.

24. An arrangement as defined in claim 23, wherein said control means is responsive to said line demand signal for inhibiting said group scanning means and actuating said unit scanning means, said unit digit means further including gating means having a gate in each unit digit line sequentially enabled by said unit scanning means for generating a stop scan signal upon detection of a scanning signal at the output of one of said gates, said stop scan signal being applied to inhibit said unit scanning means.

25. An arrangement as defined in claim 19, wherein each of said unit digit means includes first detecting means connected to said unit digit lines for inhibiting said group scanning means upon detection of a scanning signal on any line and second detecting means connected to said unit digit lines and said unit scanning means for inhibiting said unit scanning means upon detection of a scanning signal on a single unit digit line.

26. An arrangement as defined in claim 25, wherein said group scanning means includes tens and hundreds counters providing tens and hundreds identification signals and matrix means responsive to said tens and hundreds identification signals for successively generating a scanning signal on respective scanning lines to the respective groups of line circuits.

* * * * *

UNITED STATES PATENT OFFICE

CERTIFICATE OF CORRECTION

PATENT NO. : 3699263

DATED : October 17, 1972

INVENTOR(S) : Gunter F. Neumeier and Otto Altenburger

It is certified that error appears in the above-identified patent and that said Letters Patent are hereby corrected as shown below:

| | |
|---|---|
| Col. 1, line 8 | "request" should read ---requests---. |
| line 12 | "-y-" should read --- -by- --- |
| Col. 2, line 2 | "request" should read ---requests---. |
| Col. 4, line 12 | "call" should read ---calls--- |
| Col. 6, line 27 | Delete "of". |
| Col. 12, line 18 | "HI" should read ---HT---. |
| line 25 | "tat" should read ---that---. |
| Col. 14, line 41 | "the" (first occurrence) should read ---The---. |
| Col. 21, line 27 | "con-" should start a new paragraph. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*